United States Patent
Bonnet

(10) Patent No.: US 8,960,598 B2
(45) Date of Patent: Feb. 24, 2015

(54) SYSTEM FOR ATTACHING AN IMPELLER ENGINE

(75) Inventor: Mathieu Bonnet, Toulouse (FR)

(73) Assignee: Airbus Operations S.A.S., Toulouse (FR)

( * ) Notice: Subject to any disclaimer, the term of this patent is extended or adjusted under 35 U.S.C. 154(b) by 608 days.

(21) Appl. No.: 13/381,517

(22) PCT Filed: Jul. 1, 2010

(86) PCT No.: PCT/FR2010/051387
§ 371 (c)(1),
(2), (4) Date: May 14, 2012

(87) PCT Pub. No.: WO2011/001121
PCT Pub. Date: Jan. 6, 2011

(65) Prior Publication Data
US 2012/0211597 A1    Aug. 23, 2012

(30) Foreign Application Priority Data
Jul. 3, 2009   (FR) ...................................... 09 54581

(51) Int. Cl.
*B64D 27/00*   (2006.01)
*B64D 27/26*   (2006.01)

(52) U.S. Cl.
CPC .......... *B64D 27/26* (2013.01); *B64D 2027/266* (2013.01)
USPC ........................................................ 244/54

(58) Field of Classification Search
USPC ..................................... 244/54; 248/556, 557
See application file for complete search history.

(56) References Cited

U.S. PATENT DOCUMENTS

| 2,541,566 | A  | * | 2/1951 | Applegate | 248/556 |
| 4,214,738 | A  | * | 7/1980 | Casper | 267/141.1 |
| 4,361,296 | A  | * | 11/1982 | Hall et al. | 244/54 |
| 5,108,045 | A  |   | 4/1992 | Law et al. | |
| 5,379,970 | A  | * | 1/1995 | Linthicum et al. | 244/54 |
| 6,296,203 | B1 |   | 10/2001 | Manteiga et al. | |
| 6,397,988 | B1 | * | 6/2002 | Ptak | 188/380 |
| 7,290,644 | B2 | * | 11/2007 | Miyake | 188/379 |
| 8,474,751 | B2 | * | 7/2013 | Lebas et al. | 244/54 |
| 8,646,724 | B2 | * | 2/2014 | Bonnet et al. | 244/54 |

(Continued)

FOREIGN PATENT DOCUMENTS

| EP | 0 455 355 | 11/1991 |
| EP | 1 982 915 | 10/2008 |
| FR | 2 917 713 | 12/2008 |

OTHER PUBLICATIONS

International Search Report Issued Oct. 29, 2010 in PCT/FR10/51387 Filed Jul. 1, 2010.

*Primary Examiner* — Christopher P Ellis
(74) *Attorney, Agent, or Firm* — Oblon, Spivak, McClelland, Maier & Neustadt, L.L.P.

(57) ABSTRACT

The invention relates to a system for attaching an element (3) capable of vibrating onto an aircraft structure (2), comprising at least one pair of scoops (10) attached onto the element capable of vibrating, as well as onto the structure, each scoop (10a, 10b) of the pair of scoops comprising: an outer rigid element (12) attached onto the structure; an inner rigid element (13) mounted inside the outer rigid element and rigidly connected to the element capable of vibrating; and a flexible element (14) placed along each outer rigid element flank, between the outer rigid element and the inner rigid element.

10 Claims, 2 Drawing Sheets

(56) References Cited

U.S. PATENT DOCUMENTS

| | | | |
|---|---|---|---|
| 8,770,513 B2* | 7/2014 | Barber et al. | 244/54 |
| 2006/0214339 A1* | 9/2006 | Miyake | 267/140.12 |
| 2009/0032673 A1 | 2/2009 | Dron et al. | |
| 2009/0090811 A1 | 4/2009 | Llamas Sandin | |
| 2010/0181417 A1 | 7/2010 | Combes et al. | |
| 2012/0018575 A1* | 1/2012 | Whiteford et al. | 244/54 |

* cited by examiner

SYSTEM FOR ATTACHING AN IMPELLER ENGINE

FIELD OF THE INVENTION

The invention pertains to a system for attaching an impeller engine to an engine strut of an aircraft providing for the absorption of at least a part of the vibrations coming from the engine. The invention also pertains to a method for implementing this system of attachment.

The invention can be applied in the field of aeronautics and especially in the field of connections between a strut and an aircraft engine.

Prior Art

In the field of aeronautics, there are many types of engines:
- turbojet engines generally installed beneath the wing structure of the aircraft and connected to this wing structure by means of an engine pylon or engine strut, and
- turboprop engines installed in the rear of the aircraft or beneath the aircraft wing structure.

At the present day, the aircraft most commonly used are turbojet aircraft. However, these aircraft have the drawback of requiring high fuel (kerosene). For these reasons, certain aircraft manufacturers are continuing to develop turboprop aircraft. Indeed, aircraft using impellers have the advantage of consuming substantially less kerosene than turbojet aircraft. However, they have the drawback of generating numerous vibrations which are detrimental to the structure of the aircraft and relatively uncomfortable for the passengers. The vibrations generated by the motion of the propellers is transmitted to the fuselage of the aircraft through the engine strut attaching the engine to the fuselage. This transmission of vibrations can be attenuated by the system used to attach the engine.

There are currently several types of systems for attaching the engine to the fuselage of the aircraft. In particular, there is a rigid attachment system used as a junction between the engine and the fuselage (or the wing structure) of the aircraft. This type of rigid attaching system provides efficient transmission of stresses from the engine to the aircraft but absorbs no vibrations. A rigid attaching system such as this is particularly well suited to turbojet aircraft which generate practically no vibrations. However, it is not suited to aircraft with impeller engines.

It has been envisaged to make systems for attaching the engine to the fuselage that are capable of absorbing vibrations. Indeed, there are various known ways to absorb vibrations. A system for absorbing vibrations known in particular is the dynamic resonator which has the effect of producing a force antagonistic to the vibration in order to cancel it out. Such a resonator is placed generally on a structural node enabling it to be made to vibrate. However, a dynamic resonator such as this has the defect of having a very limited range of operation that is valid for a given frequency only. Such a system therefore cannot very efficient in a system for attaching an impeller engine in which vibrations of several types are generated at different frequencies.

There is also a known system enabling the absorption of vibrations, namely the damper. The use of a damper does not make it possible to change the vibratory modes but makes it possible to smoothen the peaks resulting from these modes. Thus, in order to be efficient, a damper needs a minimum speed; it therefore cannot dampen all the vibrations generated by an impeller engine.

The system currently used to attach impeller engines is a soft system made out of a material having the property of absorbing vibrations. A soft attachment system of this kind, also called a soft mount is generally made out of an elastomer. Relatively low rigidity as well as the absorption proper to this material enables a filtering of the vibration, i.e. an attenuation of a certain number of vibrations.

At present, the attachment systems used for impeller engines do not entirely fulfill their filtering role at low frequencies, i.e. for vibrations having a frequency below 20 Hz. Indeed, these flexible attachment systems, made out of elastomer, work under compression. Their rigidity curve, which is a function of the force applied in compression, is of a non-linear and appreciably hyperbolic type. Thus, the greater the compressive load applied, the greater the increase in rigidity. Consequently, when the stresses to be transmitted to the structure are high, the elastomer becomes rigid. Since this rigidity curve is hyperbolic, the rigidity of the flexible element increases far more rapidly than the stresses applied. Furthermore, it is difficult to determine the progress of this rigidity with precision. As a consequence, for a load which is not necessarily very high, the inherent mode of suspension becomes too high to act as a filter. The soft suspension therefore loses its filtering behavior.

In other words, as soon as the stresses coming from the engine exceed the standard stresses of flight in cruising mode, the elastomer becomes relatively rigid or even completely rigid. It no longer offers any flexibility and no longer absorbs vibrations.

SUMMARY OF THE INVENTION

The invention is aimed precisely at overcoming the drawbacks of the techniques described here above. To this end, the invention proposes a system for attaching an impeller engine to an engine strut comprising a rigid element and a flexible element interposed between the rigid elements, so as to enable the flexible element to work under shear stresses up to a limit stop. The rigidity curve of the elastomer under shear stresses being linear, the system for attaching of the invention remains flexible under a level of engine stress far greater than in the case of the prior art soft system. However, as soon as the stresses coming from the engine become particularly high, especially under high speed, the flexible element comes to a limit stop so that the attaching system no longer filters vibrations but transmits the totality of the stresses.

More specifically, the invention pertains to a system for attaching an element capable of vibrating on an aircraft structure, comprising at least one pair of scoops fixed, on the one hand, to the element capable of vibrating and, on the other hand, to the structure, characterized in that each scoop of the pair of scoops comprises:
- an external rigid element fixed to the structure,
- an internal rigid element mounted within the external rigid element and fixedly joined to the element capable of vibrating, and
- a flexible element placed along each flank of the external rigid element between the external rigid element and the internal rigid element.

The attachment system of the invention may comprise one or more of the following characteristics:
- the flexible element is a plate made of an elastomer-based material,
- the flexible element is capable of working under shear,
- it comprises a first clearance situated between the external rigid element and the element capable of vibrating, it comprises a second clearance situated between the internal rigid element and the external rigid element, it comprises a spacer placed between the internal rigid element and the external rigid element, the element capable of vibrating is an impeller engine and the structure is an engine pylon.

The invention also pertains to a method for implementing the system for attaching described here above. This method is characterized by the fact that it comprises:

a flexible operation in which the system is capable of absorbing the vibrations coming from the element capable of vibrating when the loads generated by this element are normal, and a non-flexible operation in which the system is capable of becoming limit-stopped when said loads are extreme.

The method according to the invention may comprise the following characteristic:

when the system is in non-flexible operation, at least one of the first and second clearances is filled.

The invention also pertains to an aircraft equipped with an impeller engine connected to an engine pylon by means of a system for attaching as described here above.

DETAILED DESCRIPTION OF EMBODIMENTS OF THE INVENTION

The invention pertains to a system for attaching an element capable of vibrating to an aircraft structure. It pertains more particularly to a system for attaching an impeller engine to an engine pylon of an aircraft.

In any aircraft, the engine is fixed to the engine pylon which is itself fixed to the structure of the aircraft. When it is an impeller engine, it may be fixed to the wing structure of the aircraft laterally on either side of the fuselage or in the rear of the aircraft. In the embodiment of the invention described here below, we shall consider the case where the impeller engine is fixed to an engine pylon which is itself fixed to the side of the rear fuselage of the aircraft.

The engine is fixed to the engine pylon by means of at least one system for attaching according to the invention. This system for attaching is what is called a scoop-based system. It has at least two scoops placed so as to be facing each other on either side of the engine pylon or more specifically on either side of the primary structure of the pylon.

Figure 1:
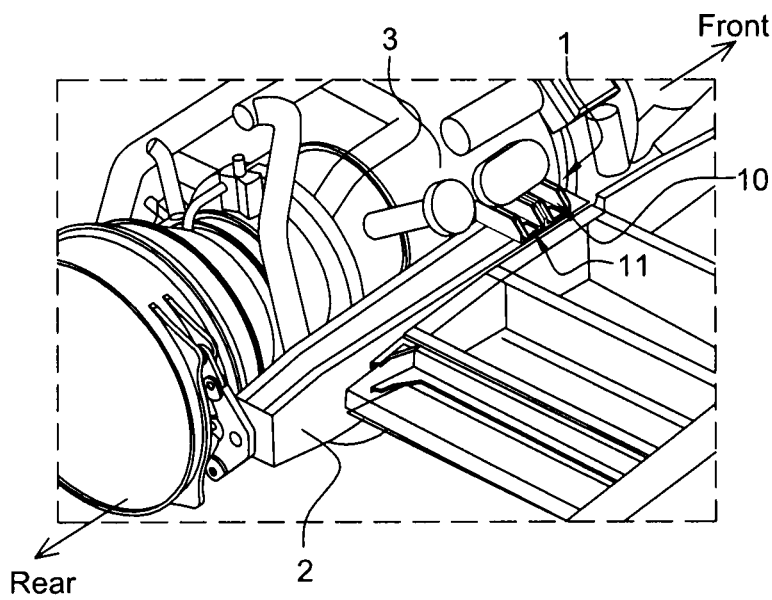
FIG. 1 represents a general view of an aircraft structure to which the system for attaching of the invention can be fixed.

FIG. 1 presents an example of a link between an engine and an engine pylon comprising a system for attaching according to the invention. The system for attaching 1 of the invention is fixed to the engine 3 on the one hand and to the structure of the pylon 2 on the other hand. The structure of the engine pylon 2 is placed in the space situated between two pairs of scoops 10 and 11.

In the example of FIG. 1, the attachment system 1 of the invention is mounted in front of the engine because the temperature, at the front of the engine, is not as high as it is in the rear. However, it is possible to envisage mounting this attachment system in the rear of the engine.

In the preferred embodiment of the invention, shown in FIG. 1, the system for attaching is implanted in an engine environment where it plays the role of an engine attachment piece. However, it can be installed on numerous junctions of the aircraft structure, for example on a fuselage junction, this attachment system fulfilling the role of a flexible structural link.

Figure 2:
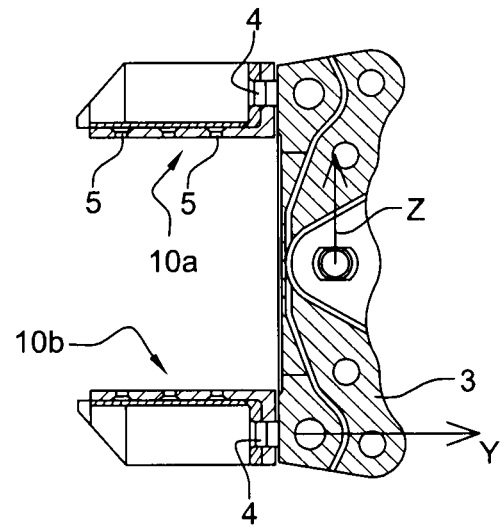
FIG. 2 represents a side view of a system for attaching of the invention.

One example of a pair of scoops of the system for attaching of the invention is shown in FIG. 2. Indeed, the system for attaching 1 of the invention may comprise one or more pairs of scoops 10. In the preferred embodiment of the invention, the pairs of scoops are dual as can be seen in FIG. 1. However, as can be seen in FIG. 2, the system for attaching may comprise only one pair of scoops. 10.

This FIG. 2 shows the pair of scoops 10 in a side view before the mounting of the engine pylon. This pair of scoops 10 comprises an upper scoop 10a and a lower scoop 10b facing each other. Each scoop 10a, 10b is fixed to the engine 3 by a first fastening means 4 and to the engine pylon (not shown in FIG. 2) by second fastening means 5.

Figure 3:
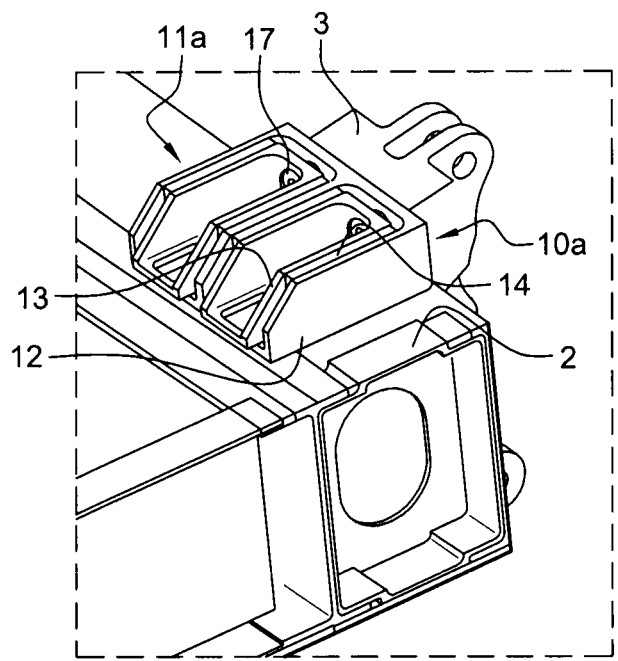
FIG. 3 represents a view in profile of the upper scoops of the system of the invention.
Figure 4:
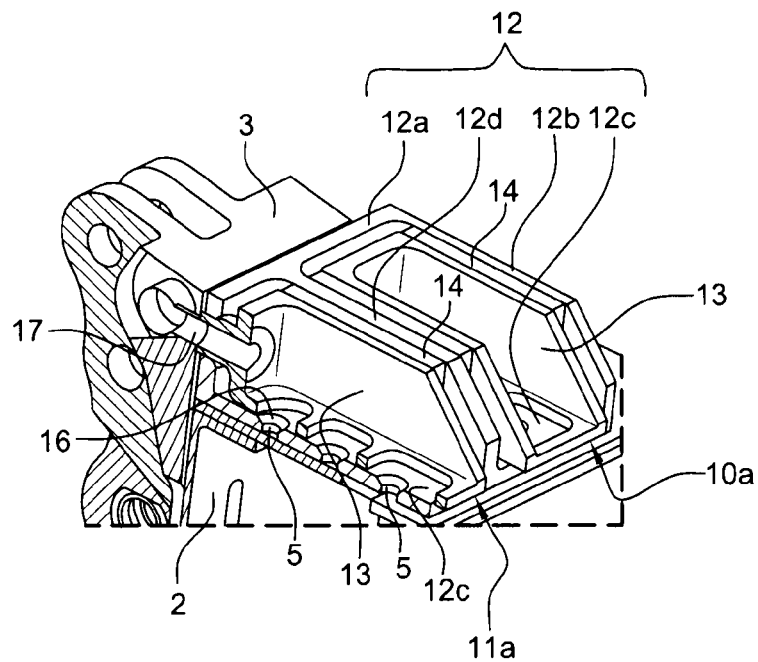
FIG. 4 is a profile view in section of a double scoop of the system of the invention.

FIGS. 3 and 4 show a profile view of the upper part of the system for attaching 1. These two FIGS. 3 and 4 show the upper part of the system for attaching when it has a dual pair of scoops. It must be noted that the lower scoops 10b are identical to the upper scoops 10a, 11a except that they are positioned in the reverse sense (the floors 12c of the upper and lower scoops are face to face) to enable them to be fastened to the pylon.

Whether it is an upper scoop or a lower scoop, each scoop has an external rigid element 12, an internal rigid element 13 and two flexible elements 14. In the case of a double scoop, the central wall 12d of the external rigid element is common to both scoops 10a, 11a.

The external rigid element 12 has a substantially U shape comprising two vertical side walls 12b, a floor 12c and a vertical real wall 12a. The side walls 12b, 12d have their front face substantially slanted. The external rigid element 12 is fixed to the box of the pylon 2 by means of second fastening means 5 that pass through holes 16 made in the floor 12c of said external rigid element. These second fastening means 5 are elements used for shearable fastening.

Figure 5:
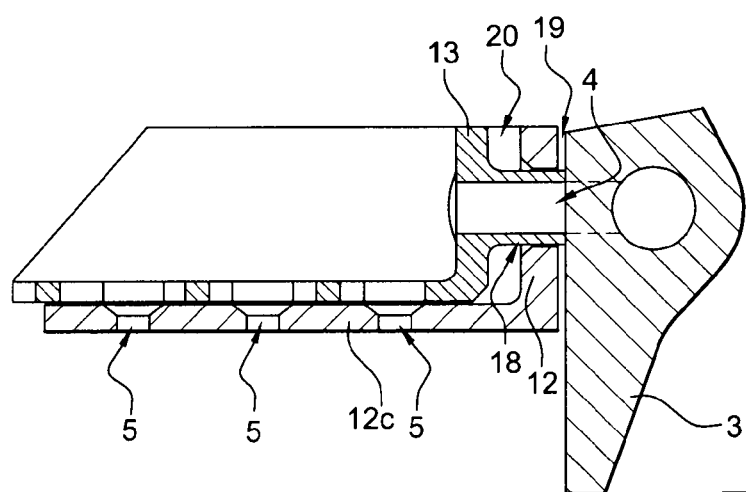
FIG. 5 is a side view in section of an upper scoop of the system of the invention.

The internal rigid element 13 has a shape substantially identical to that of the external rigid element 12 with a floor comprising holes of a diameter greater than that of the holes 16 of the external rigid element 12. The internal rigid element 13 is adapted for being mounted within the external rigid element 12. The internal rigid element 13 is fixed to the engine 3 by means of a first fastening means 4 which cannot be seen in FIGS. 3 and 4. This first fastening means can be for example a tensioning bolt 4 inserted, as shown in FIG. 5, into a hole 17 passing through the external rigid element and the internal rigid element. This first fastening means fixedly joins the internal rigid element with the engine 3.

A rectangular flexible element 14 is placed along each vertical side wall 12b also called a flank of the external rigid element between the external rigid element and the internal rigid element. Thus, each scoop 10a, 11a has two flexible elements 14 vertically fixed between the flanks of the internal rigid elements and the external rigid elements. These flexible elements 14 are plates of a flexible material capable of undergoing shear displacement relatively to the flanks of the external rigid element.

FIG. 5 shows a view in section of a scoop of the system for attaching of the invention. This view in section shows the external rigid element 12 with its shearable fastenings 5 as well as the tensioning bolt 4 which goes through the external rigid element 12 and the internal rigid element 13 through the hole 17 and fastens the system for attaching 1 to the engine 3. It also shows a spacer 18 that is placed between the internal rigid element and the rear wall 12a of the external rigid element and has the role of preventing the pre-tensioning of the tensioning bolt from putting the internal and external rigid elements in contact. FIG. 5 furthermore shows a first clearance 19 situated between the external rigid element 12 and the engine 3 and a second clearance 20 situated between the internal rigid element 13 and the external rigid element 12. In one embodiment of the invention, the first clearance 19 has a size of about 4 mm and the second clearance 20 has a size of about 14 mm. These two clearances together form the course of travel of the internal rigid element, in its flexible operation. The clearances are chosen to be non-symmetrical because the loads, i.e. the transmission stresses, are not symmetrical.

As explained here above, each scoop or double scoop of the system for attaching of the invention is fixed to the engine by means of a tensioning bolt and to the box of the engine pylon by means of shearable fastening elements. The internal rigid element is therefore directly connected to the engine and the external rigid element in directly connected to the engine pylon. It will be understood that the transmission of the stresses between the engine and the pylon is done through the rigid elements connected to one another by the flexible element. More specifically, the stresses coming from the engine are transmitted by the tensioning bolt to the scoop. The tensioning bolt loads internal rigid element wit-h the scoop, i.e. it transmits its stresses to it; these stresses are then transmitted to an external rigid element by means of the flexible element which works under shear stresses. Finally, the external rigid element transmits the stresses to the engine pylon by means of the shearable fastening elements.

In such an operation, the vibrations have the effect of prompting a slight oscillation of the stresses perceived by the internal rigid element. The clearances 19 and 20 present between the internal rigid element and the external rigid element, at the base and at the bore through which the strap passes enable the internal rigid element to move relatively to the external rigid element. These clearance values associated with the flexible elements enable vibrations to be absorbed.

In the operation such as it has just been described, known as flexible operation, the system for attaching provides for an absorption of the torque of stresses transmitted by the impeller engine, the absorption of the stresses is done along the directions Y and Z shown in FIG. 2 and with a torsion Mx about the axis X.

In the preferred embodiment of the invention, the rigid elements are made out of a metal material and the flexible elements are made out of an elastomer-based material. According to the invention, the elastomer works under shear stresses. Indeed, the elastomer has a rigidity curve under shear that is linear. Thus, the elongation of the flexible element is proportional to the force undergone. This linearity of the rigidity curve of the elastomer under shear stresses provides for better understanding of the phenomena. It also enables optimum control of the rigidity of the elastomer as a function of its geometrical characteristics.

The linearity of the rigidity curve of the elastomer furthermore makes it possible to determine a limit-stopped shear force, i.e. a level of shearing as of which the elastomer is no longer capable of absorbing the stresses received. Indeed, it can easily be understood that to enable a transfer of very high load stresses under shear, it is necessary to have a very large thickness/surface area, making it necessary to take up a certain amount of space.

Thus, in the invention, it is proposed to dampen the vibrations having a frequency contained within a certain range of frequencies. The system for attaching of the invention is therefore designed to enable the damping of vibrations having a frequency below a predefined value, of the order of 10 to 20 Hz. This range of use is chosen so as to cover all the loads in current flight, i.e. in the phases of normal flight. For extreme loads, i.e. in case of extreme flight (such as in the case of strong gusts etc), the system goes into a state of metal-on-metal limit stop: The term "limit stop of the scoop" designates the positioning of the internal rigid element against the external rigid element.

In limit-stop position, the flexible element has no vibration absorbing role. The system for attaching of the invention can then work in a non-flexible operating mode. In this non-flexible operating mode, at least one of the two clearances 19 and 20 is filled. The internal rigid element is in direct contact with the external rigid element. The stresses coming from the engine are therefore conveyed directly by contact between the engine to the external rigid element. They then get discharged immediately into the strut by means of the shearable fastenings.

Figure 6:
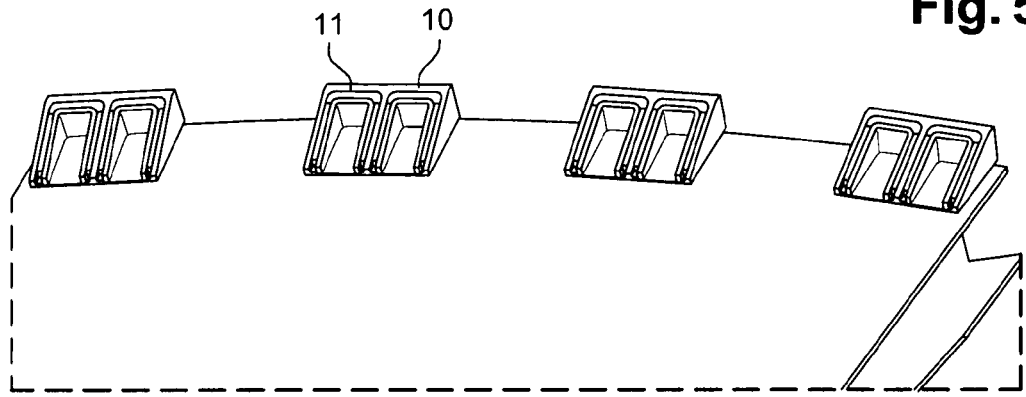
FIG. 6 represents a piano junction in which the system of the invention can be implanted.

The system for attaching of the invention has just been described for a case where it attaches an engine to an engine pylon. Such a system for attaching with flexible scoops can also be implanted at the junction between the engine pylon and the fuselage. Indeed, at present in aircraft, the junction between the engine pylon and the fuselage is achieved by piano junctions, i.e. several consecutive junctions as can be seen in FIG. 6. These piano junctions can be made by means of the flexible scoops of the invention, as described here above, these piano junctions then enabling the absorption of the vibrations between the pylon and the fuselage of the aircraft.

The invention claimed is:

1. A system for attaching an element that vibrates on an aircraft structure, comprising at least one pair of scoops fixed to the element and to the structure, wherein each scoop of the pair of scoops comprises:
   an external rigid element fixed to the structure,
   an internal rigid element mounted within the external rigid element and fixedly joined to the element that vibrates, and
   a flexible element placed along flanks of the external rigid element between the external rigid element and the internal rigid element.

2. The system for attaching according to claim 1, wherein the flexible element is a plate made of an elastomer-based material.

3. The system for attaching according to any one of the claims 1 to 2, wherein the flexible element is configured to work under shear.

4. The system for attaching according to claim 1, wherein a first clearance is situated between the external rigid element and the element that vibrates.

5. The system for attaching according to claim 4, wherein a second clearance is situated between the internal rigid element and the external rigid element.

6. The system for claim 1, further comprising a spacer placed between the internal rigid element and the external rigid element.

7. The system for attaching according claim 1, wherein the element that vibrates is an impeller engine and the structure is an engine pylon.

8. A method for implementing a system for attaching an element that vibrates on an aircraft structure, comprising at least one pair of scoops fixed to the element and to the structure, wherein each scoop of the pair of scoops comprises an external rigid element fixed to the structure, an internal rigid element mounted within the external rigid element and fixedly joined to the element, and a flexible element placed along flanks of the external rigid element between the external rigid element and the internal rigid element, the method comprising:
- a flexible operation in which the system absorbs the vibrations from the element that vibrates when the loads generated by the element are normal, and
- a non-flexible operation in which the system is limit-stopped when said loads are extreme.

9. A method according to claim 8, wherein when the system is in the non-flexible operation, at least one of a first clearance between the external rigid element and the element and a second clearance between the internal rigid element and the external rigid element is filled.

10. An aircraft comprising:
- a system for attaching an element that vibrates on an aircraft structure, comprising at least one pair of scoops fixed to the element and to the structure, wherein each scoop of the pair of scoops comprises:
  an external rigid element fixed to the structure,
  an internal rigid element mounted within the external rigid element and fixedly joined to the element that vibrates, and
  a flexible element placed along flanks of the external rigid element between the external rigid element and the internal rigid element.

* * * * *